(12) United States Patent
Kim et al.

(10) Patent No.: US 9,467,197 B2
(45) Date of Patent: Oct. 11, 2016

(54) FRONT END CIRCUIT

(71) Applicant: Samsung Electro-Mechanics Co., Ltd., Suwon-si (KR)

(72) Inventors: Se Jong Kim, Suwon-si (KR); Hyung Jun Cho, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/966,223

(22) Filed: Dec. 11, 2015

(65) Prior Publication Data

US 2016/0191106 A1 Jun. 30, 2016

(30) Foreign Application Priority Data

Dec. 30, 2014 (KR) .................. 10-2014-0193355

(51) Int. Cl.
*H04B 1/44* (2006.01)
*H04M 1/00* (2006.01)
*H04B 1/48* (2006.01)

(52) U.S. Cl.
CPC ........................................ *H04B 1/48* (2013.01)

(58) Field of Classification Search
CPC ...... H04B 1/0057; H04B 1/006; H04B 1/44; H04B 1/48
USPC ................................ 455/78, 83, 552.1–553.1
See application file for complete search history.

(56) References Cited

U.S. PATENT DOCUMENTS

| | | | |
|---|---|---|---|
| 2005/0030109 A1 | 2/2005 | Kim | |
| 2009/0093270 A1* | 4/2009 | Block | H04B 1/52 455/552.1 |
| 2012/0049985 A1 | 3/2012 | Kawai et al. | |
| 2013/0078937 A1 | 3/2013 | Leverich | |
| 2013/0169333 A1* | 7/2013 | Oshima | H03H 11/16 327/237 |
| 2013/0309984 A1* | 11/2013 | Uejima | H04B 1/006 455/114.1 |
| 2014/0049298 A1 | 2/2014 | Lim et al. | |
| 2014/0062614 A1* | 3/2014 | Park | H04B 1/006 333/133 |
| 2015/0318890 A1* | 11/2015 | Uejima | H04B 1/18 455/83 |
| 2015/0341058 A1* | 11/2015 | Khlat | H04B 1/0057 370/297 |
| 2015/0341076 A1* | 11/2015 | Uejima | H04B 1/0057 455/78 |

FOREIGN PATENT DOCUMENTS

| | | |
|---|---|---|
| JP | 2005-260784 A | 9/2005 |
| KR | 10-2005-0017151 A | 2/2005 |
| KR | 10-2012-0024446 A | 3/2012 |
| KR | 10-2014-0022658 A | 2/2014 |
| KR | 10-2014-0024436 A | 2/2014 |
| KR | 10-2014-0030781 A | 3/2014 |
| WO | WO 2012/166556 A1 | 12/2012 |

\* cited by examiner

*Primary Examiner* — Simon Nguyen
(74) *Attorney, Agent, or Firm* — NSIP Law (57) ABSTRACT

A front end circuit includes a switch including two ports disposed at a primary side of the switch and ports disposed at a secondary side of the switch. The front end circuit also includes a filter unit forming return paths using at least a portion of the ports disposed on the secondary side of the switch. The filter unit includes a filter positioned on each of the return paths.

19 Claims, 6 Drawing Sheets

FRONT END CIRCUIT

CROSS-REFERENCE TO RELATED APPLICATION

This application claims the priority and benefit under 35 USC 119(a) of Korean Patent Application No. 10-2014-0193355 filed on Dec. 30, 2014, with the Korean Intellectual Property Office, the disclosure of which is incorporated herein by reference.

BACKGROUND

1. Field

The following description relates to a front end circuit.

2. Description of Related Art

Wireless communications technology has been consistently used in various electronic devices. A front end is one technological and structural element of wireless communications technology.

A front end includes a circuitry that amplifies or filters received signals and providing amplified or filtered signals. Recently, processing of various frequency bands using one front end circuit is in demand.

Because a demand exists for the front end circuit to filter or amplify various frequency bands, the front end circuit includes multiple filters, each assigned to a particular frequency band.

Furthermore, as described above, because the front end circuit includes various filters, a plurality of switch devices are used in the front end circuit. Therefore, a size of the front end circuit has increased, and a demand for miniaturization of electronic devices is not satisfied.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a front end circuit, including: a switch including two ports disposed at a primary side of the switch and ports disposed at a secondary side of the switch; and a filter unit forming return paths using at least a portion of the ports disposed on the secondary side of the switch, wherein the filter unit may include filters positioned on the return paths.

The filters may operate in different frequency bands.

The ports may be disposed at the secondary side of the switch comprise 2N ports, wherein N is a natural number, and a first port of the two ports may be connected to any one of $1^{st}$ to $N^{th}$ ports disposed at the secondary side and a second port of the two ports is connected to any one of $N+1^{th}$ to $2N^{th}$ ports disposed at the secondary side.

The return paths may be paths from first ports of the ports at the secondary side toward second ports of the ports at the secondary side.

The filters may be connected between the first and second ports in series.

The switch may be configured as a single switch integrated circuit.

The switch may include: a first switching block including the first port and N ports connectable to the first port and disposed at the secondary side, wherein N is a natural number; and a second switching block including the second port and N ports connectable to the second port and disposed at the secondary side, and the first and second switching blocks are electrically insulated from each other within the switch.

The switch further may include a signal receiving terminal receiving switching control signals for the first and second switching blocks.

The first port may be connected to an antenna, and the second port is connected to an output terminal.

The front end circuit may also include an amplifying unit connected to the primary side of the switch and configured to amplify input signals.

The amplifying unit may include: a first inductor including one end connected to the primary side; and an amplifier including one end connected to another end of the first inductor and another end connected to an output terminal.

The amplifying unit may include: an amplification switch including two ports disposed at a primary side of the amplification switch and first and second pairs of ports disposed at a secondary side of the amplification switch; a first amplifier including one end connected to one of the first pair of ports and another end connected to another of the first pair of ports; and a second amplifier including one end connected to one of the second pair of ports and another end connected to another of the second pair of ports.

The first amplifier may be operated in a frequency band different from a frequency band of the second amplifier.

The front end circuit may also include a matching unit positioned on the paths and including impedance matching circuits performing impedance matching on the filters.

The front end circuit may also include a control unit configured to control the switching of the switch in response to a frequency of an input signal received at an antenna connected to the first port, wherein the control unit may include information on each frequency band of input signals for the filters.

The control unit may confirm a frequency of the input signal, determines through which filter filtering is to be performed, and controls the switching of the switch to activate a return path associated with the filter.

In accordance with an embodiment, there is provided a front end circuit, including: a switch including two primary-side ports and pairs of secondary-side ports; filters connected in series to the pairs of secondary-side ports; and a control unit configured to control switching of the multi-switch in response to frequencies of input signals.

The front end circuit may also include an amplifier connected to one of the two primary-side ports to amplify an input signal filtered by any one of the filters.

The two primary-side ports may include a first port connected to an antenna receiving the input signals; and a second port connected to the amplifier.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that when an element or layer is referred to as being "on" or "connected to" another element or layer, it can be directly on or connected to the other element or layer or through intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. These terms do not necessarily imply a specific order or arrangement of the elements, components, regions, layers and/or sections. Thus, a first element, component, region, layer or section discussed below could be termed a second element, component, region, layer or section without departing from the teachings description of the various embodiments.

Figure 1:
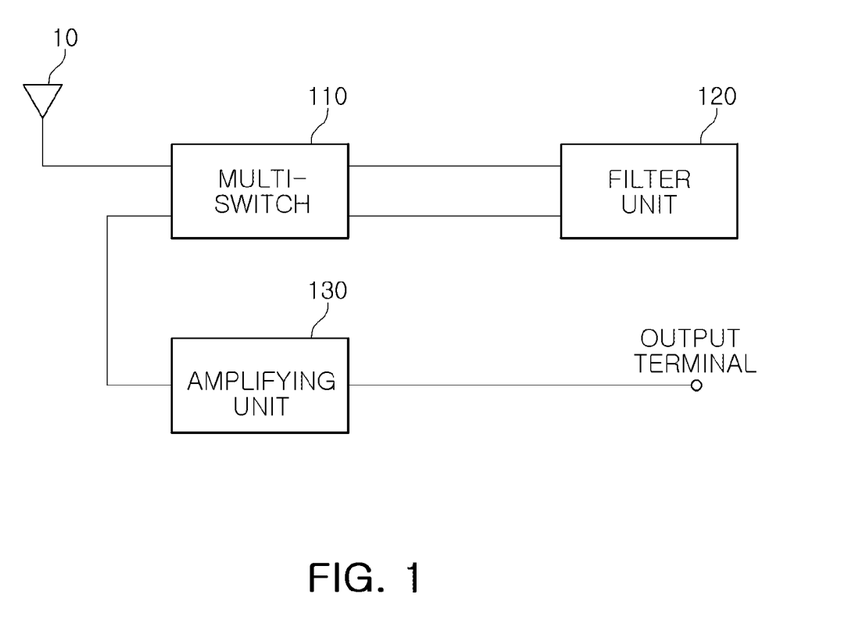
FIG. 1 is a block diagram illustrating a front end circuit, according to an embodiment.

FIG. 1 is a block diagram illustrating a front end circuit, according to an embodiment.

Referring to FIG. 1, the front end circuit 100 includes a multi-switch 110 and a filter unit 120. According to embodiments, the front end circuit 100 also includes an amplifying unit 130.

The front end circuit 100 receives input signals from an antenna 10, filters the input signals for each frequency of the input signals, and transmits the filtered signals to an output terminal. The output terminal is connected to a predetermined control circuit, such as a wireless control integrated circuit (IC).

The multi-switch 110 includes two primary-side ports disposed at a primary side thereof and plural pairs of secondary-side ports disposed at a secondary side thereof.

The multi-switch 110 includes, at least, one switch integrated circuit, enabling an entire front end circuit to be thinned.

The multi-switch 110 will be described below in more detail with reference to FIG. 2.

The filter unit 120 forms a plurality of return paths using at least a portion of the plural pairs of secondary-side ports positioned at the secondary side of the multi-switch 110. The filter unit 120 includes a plurality of filters each positioned on the return paths. For instance, the filters included in the filter unit 120 are respectively connected to the pairs of secondary-side ports of the multi-switch 110 in series.

In an embodiment, each of the filters are operated in different frequency bands. In an alternative embodiment, at least one filter of the filters is operated at a different frequency band than the other filters.

The amplifying unit 130 amplifies the input signals filtered at the filter unit 120. The amplifying unit 130 is connected to the primary side of the multi-switch 110, and amplifies input signals filtered by any one of the filters.

Figure 2:
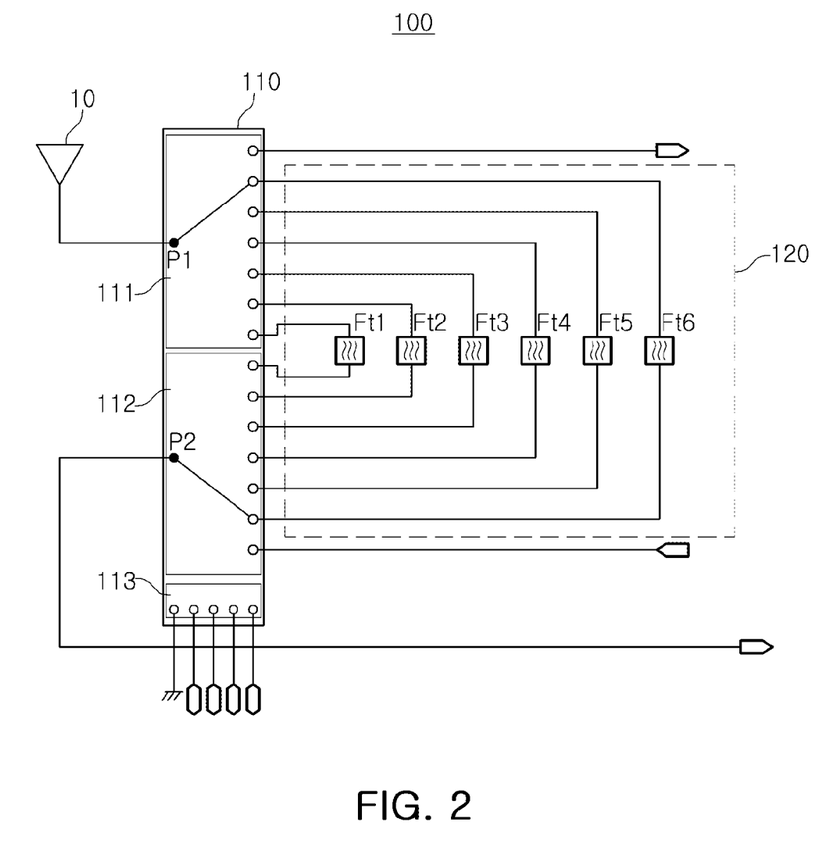
FIG. 2 is a circuit diagram illustrating an example of a multi-switch and a filter unit illustrated in FIG. 1.

FIG. 2 is a circuit diagram illustrating an example of a switch or a multi-switch 110 and a filter unit 120 illustrated in FIG. 1.

Although a 2-pole, 14-throw switch is illustrated as an example of the multi-switch 110 in FIG. 2, a number of poles and a number of ports at the secondary side may be modified. For instance, a throw side may be modified, according to embodiments.

In one example, the number of primary-side ports, for instance, 2-pole side ports, of the multi-switch 110 is two. Any one of the two primary-side ports, P1 or P2, is connected to the antenna 10 to receive input signals. Furthermore, the other of the two primary-side ports, P1 or P2, is connected to the output terminal or the amplifying unit 130 to output the filtered input signals.

The secondary side of the multi-switch 110 includes 2N (N being a natural number) ports. Because the secondary side of the multi-switch 110 includes 14-throw ports f, as shown in an example illustrated in FIG. 2, N is 7.

At least a portion of the pairs of secondary-side ports disposed at the secondary side of the multi-switch 110 forms the return paths in pairs. The filters of the filter unit 120 are positioned on the return paths and filter returned input signals.

For instance, the return paths are paths from first ports, P1 or P2, and the pairs of secondary-side ports disposed at the secondary side of the multi-switch 110. In addition, the filters Ft1 through Ft6 are connected to the first and second ports, P1 and P2, in series between the first and second ports, P1 and P2.

In FIG. 2, a first return path from a $7^{th}$ port disposed at the secondary side toward a $8^{th}$ port disposed at the secondary side to a sixth return path from a $2^{nd}$ port disposed at the secondary side toward a $13^{th}$ port disposed at the secondary side are illustrated. First to sixth filters Ft1 through Ft6 are positioned on the first to sixth return paths.

For instance, the multi-switch 110 is switched to activate any one of the return paths depending on an input frequency.

The filters Ft1 through Ft6 have different structural and functional filter configurations set depending on frequencies of the input signals. Therefore, a return path, including a filter corresponding to the frequency of the input signal, is activated.

In an embodiment, a first port, P1, disposed at the primary side of the multi-switch 110 is connected to any one of $1^{st}$ to $N^{th}$ ports disposed at the secondary side of the multi-switch 110. In addition, a second port disposed at the primary side of the multi-switch 110 is connected to any one of $N+1^{st}$ to $2N^{th}$ ports disposed at the secondary side of the multi-switch 110. As shown in FIG. 2, $1^{st}$ to $7^{th}$ ports disposed at the secondary side are connected to the first port disposed on the primary side and $8^{th}$ to $14^{th}$ ports disposed at the secondary side are connected to the second port disposed on the primary side.

According to embodiments, a sequence of ports disposed at the secondary side may be variously modified. For example, the ports disposed at the secondary side may be disposed in an alternate sequence.

In an embodiment, the multi-switch 110 is divided into two switching blocks. A first switching block 111 includes the first port, P1, disposed at the primary side and N (N being a natural number) ports connectable to the first port, P1, and disposed at the secondary side. A second switching block 112 includes the second port, P2, disposed at the primary side and N ports connectable to the second port, P2, and disposed at the secondary side. The first and second switching blocks are electrically insulated from each other within the multi-switch. In an embodiment, although the multi-switch 110 is divided into a plurality of switching blocks, the multi-switch 110 is formed on a single device, such as a micro-chip.

In an embodiment, the multi-switch 110 further includes a signal receiving terminal 113. The signal receiving terminal 113 receives switching control signals from a control circuit, for example, a control unit to be described below. The signal receiving terminal 113 adjusts switching for each switching block depending on the received switching control signal.

Figure 3:
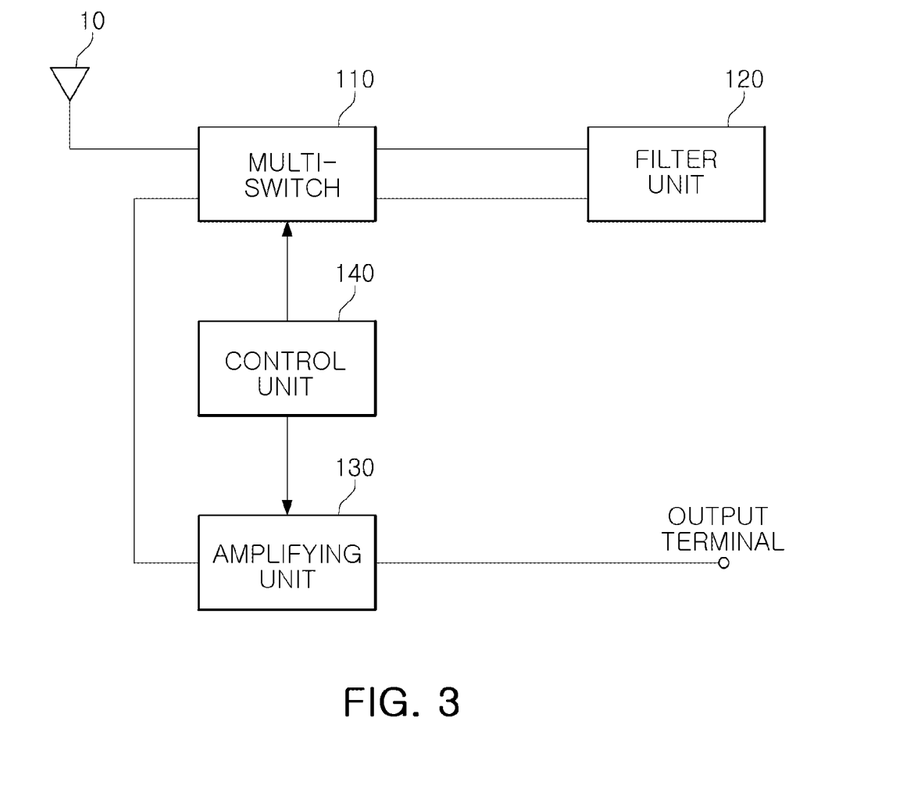
FIG. 3 is a block diagram illustrating a front end circuit, according to another embodiment.

FIG. 3 is a block diagram illustrating a front end circuit, according to another embodiment.

The front end circuit 100 illustrated in FIG. 3 also includes a control unit 140. The description presented above describing the multi-switch 110, the filter unit 120, and the amplifying unit 130 are incorporated herein.

The control unit 140 controls switching of the multi-switch 110. According to embodiments, in a case in which a switch is included in the amplifying unit 130, the control unit 140 controls switching of the amplifying unit 130.

The control unit 140 controls the switching of the multi-switch 110 in response to a frequency of the input signal input from the antenna 10.

In an embodiment, the control unit 140 has information on each frequency band of input signals for the plurality of filters of the filter unit 120. In addition, the control unit 140 has switching information associated with the filters. For example, when the input signal is input, the control unit 140 confirms a frequency of the input signal and determines through which filter filtering is to be performed. Then, the control unit 140 controls the switching of the multi-switch 110 to activate a return path on which the corresponding filter is present.

Figure 4:
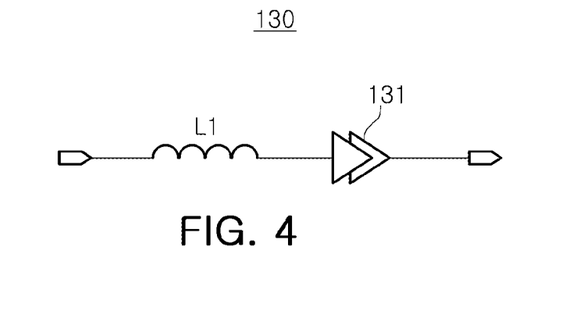
FIG. 4 is a circuit diagram illustrating an example of an amplifying unit illustrated in FIG. 1 or FIG. 3.

FIG. 4 is a circuit diagram illustrating an example of an amplifying unit illustrated in FIG. 1 or FIG. 3.

Referring to FIG. 4, the amplifying unit 130 includes a first inductor L1 having one end connected to the primary side of the multi-switch 110 and an amplifier 131 having one end connected to another end of the first inductor L1 and another end connected to an output terminal.

In one example, the amplifier 131 is implemented using a low noise amplifier (LNA). In an embodiment, the amplifier 131 is a wide band amplifier covering a wide frequency band.

Figure 5:
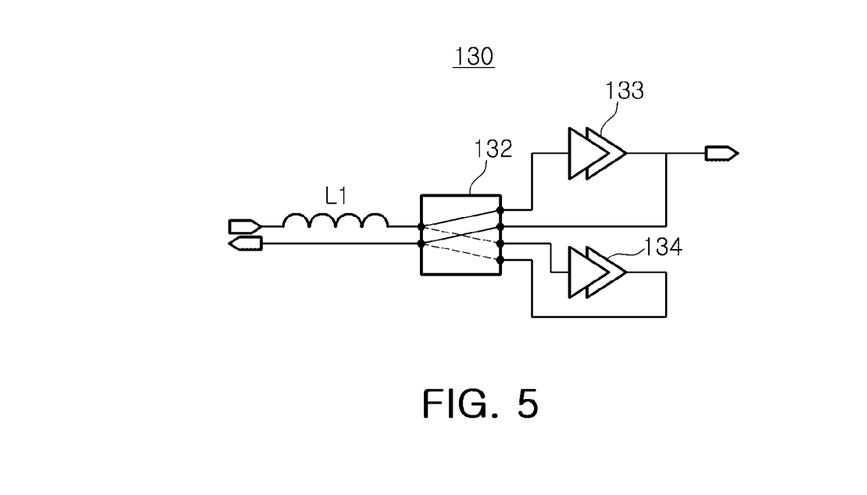
FIG. 5 is a circuit diagram illustrating another example of an amplifying unit illustrated in FIG. 1 or FIG. 3.

FIG. 5 is a circuit diagram illustrating another example of an amplifying unit illustrated in FIG. 1 or FIG. 3.

Referring to FIG. 5, the amplifying unit 130 includes an amplification switch or an amplification multi-switch 132, a first amplifier 133, and a second amplifier 134.

The amplification multi-switch 132 includes two ports disposed at a primary side thereof and first and second pairs of ports disposed at a secondary side thereof. In accordance with an embodiment, any one of the two ports disposed at the primary side of the amplification multi-switch 132 receives input signals, and is connected to an inductor L1. The other of the two ports disposed at the primary side of the amplification multi-switch 132 are connected to an output terminal to output amplified signals.

The secondary side of the amplification multi-switch 132 includes plural pairs of ports, and forms return paths, similar to the multi-switch 110. The amplifiers 133 and 134 are positioned on respective return paths.

One end of the first amplifier 133 is connected to any one of the first pair of ports disposed at the secondary side of the amplification multi-switch 132, and another end of the first amplifier 133 is connected to another of the first pair of ports disposed at the secondary side of the amplification multi-switch 132.

One end of the second amplifier 134 is connected to any one of the second pair of ports disposed at the secondary side of the amplification multi-switch 132, and another end of the second amplifier 134 may be connected to another of the second pair of ports disposed at the secondary side of the amplification multi-switch 132.

The first and second amplifiers 133 and 134 are operated at different frequency bands. For example, the first amplifier 133 amplifies signals at a middle band, and the second amplifier 134 amplifies signals at a high band.

The control unit 140 confirms a frequency band of the input signal and determines which of the first and second amplifiers 133 and 134 is used to control switching of the amplification multi-switch 132 to set the return path.

In accordance with various embodiments, although an example in which the two amplifiers are used has been illustrated in FIG. 5, three or more amplifiers may be implemented. Therefore, the amplification multi-switch 132 may include three or more pairs of ports disposed at the secondary side thereof.

Figure 6:
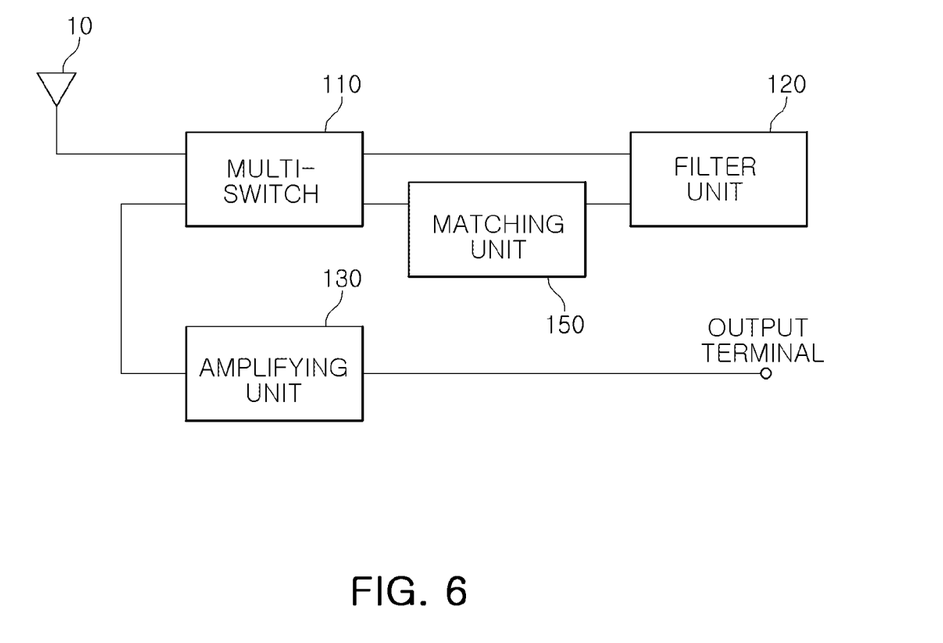
FIG. 6 is a block diagram illustrating a front end circuit, according to another embodiment.
Figure 7:
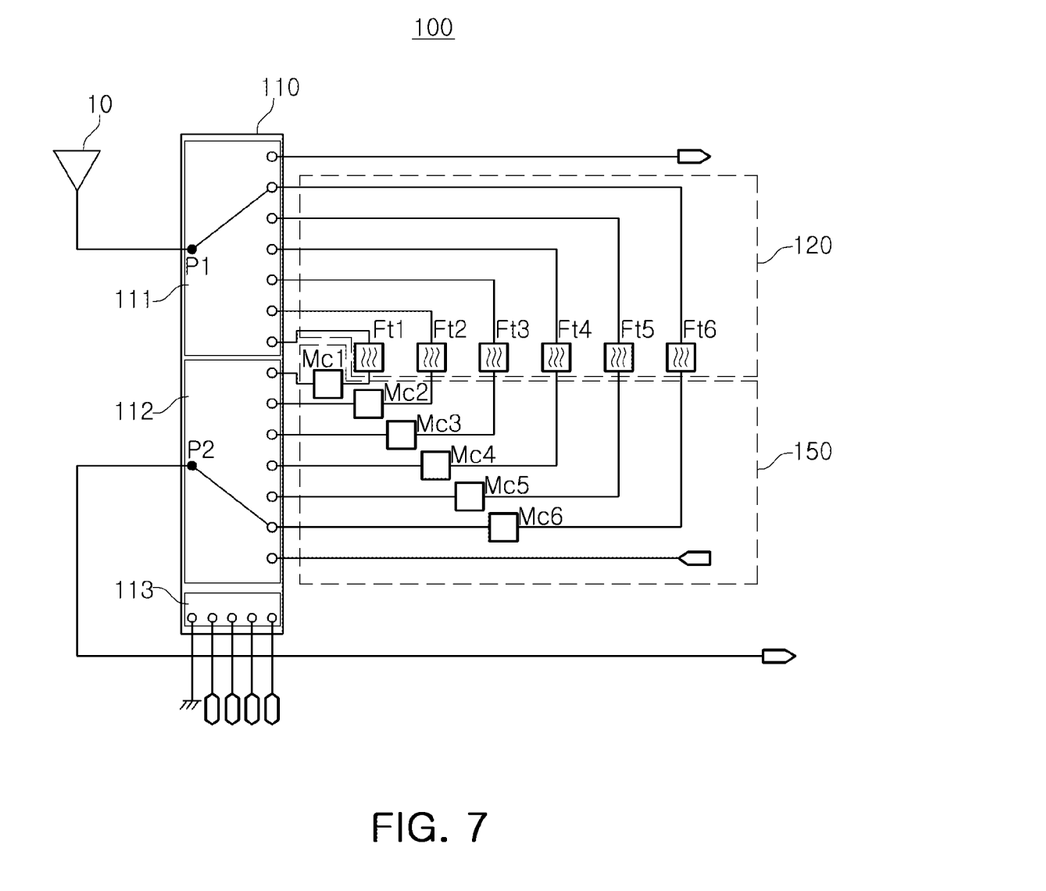
FIG. 7 is a circuit diagram illustrating an example of a multi-switch, a filter unit, and a matching unit illustrated in FIG. 6.

FIG. 6 is a block diagram illustrating a front end circuit according to another embodiment; and FIG. 7 is a circuit diagram illustrating an example of a multi-switch, a filter unit, and a matching unit illustrated in FIG. 6.

The front end circuit 100 illustrated in FIGS. 6 and 7 further include a matching unit 150. Therefore, components other than the matching unit 150 is easily understood from the description described above with reference to FIGS. 1 through 5.

Referring to FIGS. 6 and 7, the matching unit 150 performs impedance-matching on the input signals filtered in the filter unit 120 and provides the input signals on which the impedance-matching is performed to the multi-switch 110. The matching unit 150 is positioned on the plurality of return paths described above.

The matching unit 150 includes a plurality of impedance matching circuits performing the impedance matching on each of the return paths, for instance, each of the plurality of filters.

In an embodiment, because the matching is performed for each frequency band, loss characteristics of all of the input signals in various frequency bands may be excellent, and linearity of the input signals in the various frequency bands may also be improved.

As set forth above, according to an embodiment, the switch may be miniaturized. As a result, the front end circuit is miniaturized and ultra-thinned.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A front end circuit, comprising:
   a switch comprising two ports disposed at a primary side of the switch and ports disposed at a secondary side of the switch; and
   a filter unit forming return paths using at least a portion of the ports disposed on the secondary side of the switch, wherein the filter unit comprises filters positioned on the return paths.

2. The front end circuit of claim 1, wherein the filters operate in different frequency bands.

3. The front end circuit of claim 1, wherein the ports disposed at the secondary side of the switch comprise 2N ports, wherein N is a natural number, and
   a first port of the two ports is connected to any one of $1^{st}$ to $N^{th}$ ports disposed at the secondary side and a second port of the two ports is connected to any one of $N+1^{th}$ to $2N^{th}$ ports disposed at the secondary side.

4. The front end circuit of claim 1, wherein the return paths are paths from first ports of the ports at the secondary side toward second ports of the ports at the secondary side.

5. The front end circuit of claim 1, wherein the filters are connected between the first and second ports in series.

6. The front end circuit of claim 1, wherein the switch is configured as a single switch integrated circuit.

7. The front end circuit of claim 1, wherein the switch comprises:
   a first switching block comprising the first port and N ports connectable to the first port and disposed at the secondary side, wherein N is a natural number; and
   a second switching block comprising the second port and N ports connectable to the second port and disposed at the secondary side, and
   the first and second switching blocks are electrically insulated from each other within the switch.

8. The front end circuit of claim 7, wherein the switch further comprises a signal receiving terminal receiving switching control signals for the first and second switching blocks.

9. The front end circuit of claim 1, wherein the first port is connected to an antenna, and the second port is connected to an output terminal.

10. The front end circuit of claim 1, further comprising:
    an amplifying unit connected to the primary side of the switch and configured to amplify input signals.

11. The front end circuit of claim 10, wherein the amplifying unit comprises:
    a first inductor comprising one end connected to the primary side; and
    an amplifier comprising one end connected to another end of the first inductor and another end connected to an output terminal.

12. The front end circuit of claim 10, wherein the amplifying unit comprises:
    an amplification switch comprising two ports disposed at a primary side of the amplification switch and first and second pairs of ports disposed at a secondary side of the amplification switch;
    a first amplifier comprising one end connected to one of the first pair of ports and another end connected to another of the first pair of ports; and
    a second amplifier comprising one end connected to one of the second pair of ports and another end connected to another of the second pair of ports.

13. The front end circuit of claim 12, wherein the first amplifier is operated in a frequency band different from a frequency band of the second amplifier.

14. The front end circuit of claim 1, further comprising:
    a matching unit positioned on the paths and comprising impedance matching circuits performing impedance matching on the filters.

15. The front end circuit of claim 1, further comprising:
    a control unit configured to control the switching of the switch in response to a frequency of an input signal received at an antenna connected to the first port, wherein the control unit comprises information on each frequency band of input signals for the filters.

16. The front end circuit of claim 15, wherein the control unit confirms a frequency of the input signal, determines through which filter filtering is to be performed, and controls the switching of the switch to activate a return path associated with the filter.

17. A front end circuit, comprising:
    a switch including two primary-side ports and pairs of secondary-side ports;
    filters connected in series to the pairs of secondary-side ports; and
    a control unit configured to control switching of the multi-switch in response to frequencies of input signals.

18. The front end circuit of claim 17, further comprising:
    an amplifier connected to one of the two primary-side ports to amplify an input signal filtered by any one of the filters.

19. The front end circuit of claim 17, wherein the two primary-side ports comprise:
    a first port connected to an antenna receiving the input signals; and
    a second port connected to the amplifier.

* * * * *